United States Patent [19]

Ogawa et al.

[11] Patent Number: 4,628,872
[45] Date of Patent: Dec. 16, 1986

[54] COOLING SYSTEM FOR AUTOMOTIVE ENGINE OR THE LIKE INCLUDING COOLANT RETURN PUMP BACK-UP ARRANGEMENT

[75] Inventors: Naoki Ogawa, Yokohama; Takao Kubozuka, Yokosuka, both of Japan

[73] Assignee: Nissan Motor Co., Ltd., Yokohama, Japan

[21] Appl. No.: 784,174

[22] Filed: Sep. 27, 1985

[30] Foreign Application Priority Data

Sep. 29, 1984 [JP] Japan .................. 59-202948

[51] Int. Cl.$^4$ ............................................. F01P 3/22
[52] U.S. Cl. ........................ 123/41.27; 123/41.44; 165/41
[58] Field of Search ..................... 123/41.2–41.27, 123/41.44; 165/41

[56] References Cited

U.S. PATENT DOCUMENTS

| | | | |
|---|---|---|---|
| 2,136,626 | 11/1938 | Lind | 165/41 |
| 2,844,129 | 7/1958 | Beck, Jr. et al. | 123/41.21 |
| 4,367,699 | 1/1983 | Evans | 123/41.33 |
| 4,508,264 | 4/1985 | Takeda et al. | 165/41 |
| 4,548,183 | 10/1985 | Hayashi | 123/41.21 |
| 4,565,162 | 1/1986 | Seki et al. | 123/41.21 |
| 4,570,579 | 2/1986 | Hirano | 123/41.27 |

Primary Examiner—William A. Cuchlinski, Jr.
Attorney, Agent, or Firm—Schwartz, Jeffery, Schwaab, Mack, Blumenthal & Evans

[57] ABSTRACT

In the event that the normal coolant return pump of an evaporative type automotive cooling system malfunctions, a back-up system establishes fluid communication between the cooling circuit and the circulation pump of a heater circuit in a manner which enables the heater circulation pump to be used in place of the normal unit until such time as repair can be effected.

13 Claims, 11 Drawing Figures

COOLING SYSTEM FOR AUTOMOTIVE ENGINE OR THE LIKE INCLUDING COOLANT RETURN PUMP BACK-UP ARRANGEMENT

BACKGROUND OF THE INVENTION

1. Field of the Invention

The present invention relates generally to a cooling system for an internal combustion engine wherein a liquid coolant is permitted to boil and the vapor used as a vehicle for removing heat from the engine, and more specifically to such a system which includes a back-up arrangement which utilizes a pump which forms part of a cabin heating system in lieu of the normal coolant pump in the event that the latter malfunctions.

2. Description of the Prior Art

Figure 1:
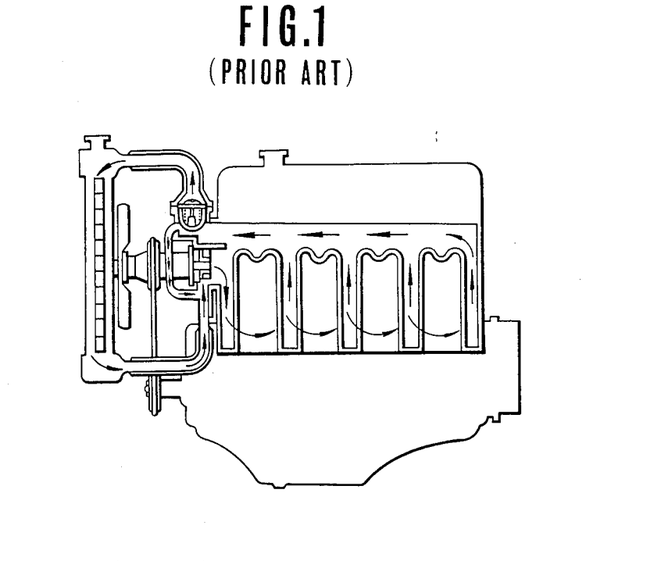
FIGS. 1 to 4 show the prior art arrangements discussed briefly in the opening paragraphs of the instant disclosure.

In currently used "water cooled" internal combustion engine such as shown in FIG. 1 of the drawings, the engine coolant (liquid) is forcefully circulated by a water pump, through a cooling circuit including the engine coolant jacket and an air cooled radiator. This type of system encounters the drawback that a large volume of water is required to be circulated between the radiator and the coolant jacket in order to remove the necessary amount of heat. Further, due to the large mass of water inherently required, the warm-up characteristics of the engine are undesirably sluggish. For example, if the temperature difference between the inlet and discharge ports of the coolant jacket is 4 degrees, the amount of heat which 1 Kgm of water may effectively remove from the engine under such conditions is 4 Kcal. Accordingly, in the case of an engine having 1800 cc displacement (by way of example) is operated full throttle, the cooling system is required to remove approximately 4000 Kcal/h. In order to achieve this, a flow rate of 167 liter/min (viz., $4000-60\times\frac{1}{4}$) must be produced by the water pump. This of course undesirably consumes a number of otherwise useful horsepower.

Figure 2:
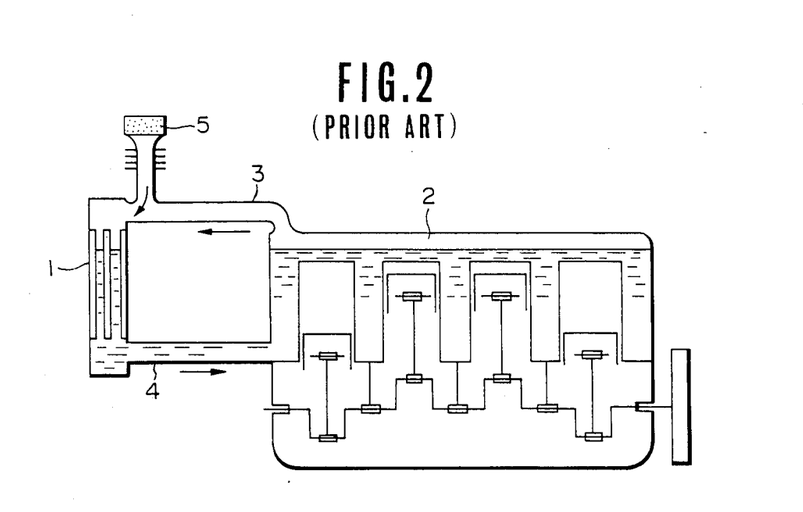

FIG. 2 shows an arrangement disclosed in Japanese Patent Application Second Provisional Publication No. Sho. 57-57608. This arrangement has attempted to vaporize a liquid coolant and use the gaseous form thereof as a vehicle for removing heat from the engine. In this system the radiator 1 and the coolant jacket 2 are in constant and free communication via conduits 3, 4 whereby the coolant which condenses in the radiator 1 is returned to the coolant jacket 2 little by little under the influence of gravity.

This arrangement while completely eliminating the power consuming circulation pump which plagues the FIG. 1 arrangement has suffered from the drawbacks that the radiator, depending on its position with respect to the engine proper, tends to be at least partially filled with liquid coolant. This greatly reduces the surface area via which the gaseous coolant (for example steam) can effectively release its latent heat of vaporization and accordingly condense, and thus has lacked any notable improvement in cooling efficiency.

Further, with this system in order to maintain the pressure within the coolant jacket and radiator at atmospheric level, a gas permeable water shedding filter 5 is arranged as shown, to permit the entry of air into and out of the system. However, this filter permits gaseous coolant to gradually escape from the system, inducing the need for frequent topping up of the coolant level.

A further problem with this arrangement has come in that some of the air, which is sucked into the cooling system as the engine cools, tends to dissolve in the water, whereby upon start up of the engine, the dissolved air tends to form small bubbles in the radiator which adhere to the walls thereof forming an insulating layer. The undissolved air also tends to collect in the upper section of the radiator and inhibit the convention-like circulation of the vapor from the cylinder block to the radiator. This of course further deteriorates the performance of the device.

European Patent Application Provisional Publication No. 0 059 423 published on Sept. 8, 1982 discloses another arrangement wherein, liquid coolant in the coolant jacket of the engine, is not forcefully circulated therein and permitted to absorb heat to the point of boiling. The gaseous coolant thus generated is adiabatically compressed in a compressor so as to raise the temperature and pressure thereof and thereafter introduced into a heat exchanger (radiator). After condensing, the coolant is temporarily stored in a reservoir and recycled back into the coolant jacket via a flow control valve.

This arrangement has suffered from the drawback that air tends to leak into the system upon cooling thereof. This air tends to be forced by the compressor along with the gaseous coolant into the radiator. Due to the difference in specific gravity, the air tends to rise in the hot environment while the coolant which has condensed moves downwardly. Accordingly, air, due to this inherent tendency to rise, forms pockets of air which cause a kind of "embolism" in the radiator and badly impair the heat exchange ability thereof.

U.S. Pat. No. 4,367,699 issued on Jan. 11, 1983 in the name of Evans (see FIG. 3 of the drawings) discloses an engine system wherein the coolant is boiled and the vapor used to remove heat from the engine. This arrangement features a separation tank 6 wherein gaseous and liquid coolant are initially separated. The liquid coolant is fed back to the cylinder block 7 under the influence of gravity while the "dry" gaseous coolant (steam for example) is condensed in a fan cooled radiator 8. The temperature of the radiator is controlled by selective energizations of the fan 9 to maintain a rate of condensation therein sufficient to maintain a liquid seal at the bottom of the device. Condensate discharged from the radiator via the above mentioned liquid seal is collected in a small reservoir-like arrangement 10 and pumped back up to the separation tank via a small constantly operated pump 11.

Figure 3:
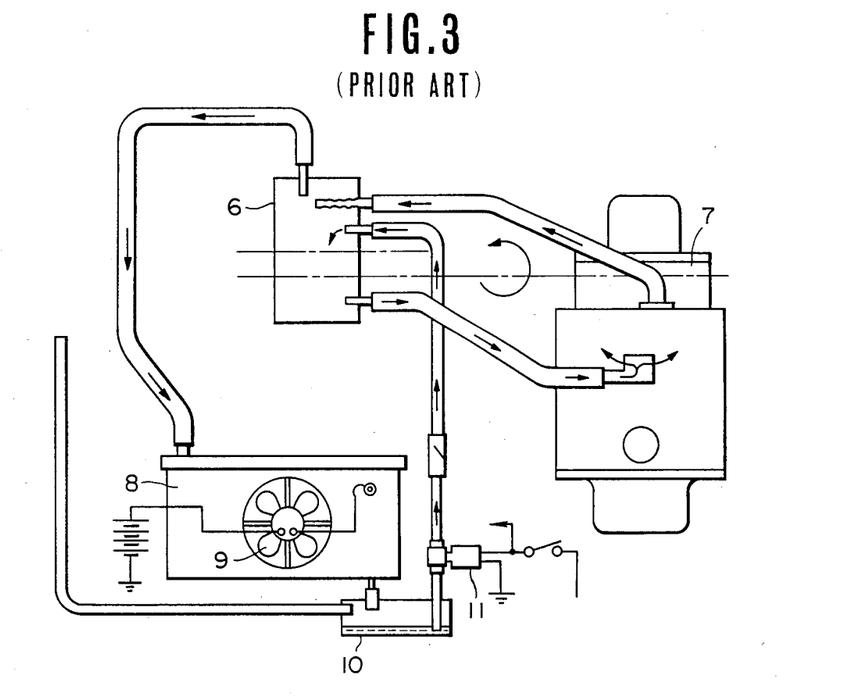

This arrangement, while providing an arrangement via which air can be initially purged to some degree from the system tends to, due to the nature of the arrangement which permits said initial non-condensible matter to be forced out of the system, suffer from rapid loss of coolant when operated at relatively high altitudes. Further, once the engine cools air is relatively freely admitted back into the system.

The provision of the separation tank 6 also renders engine layout difficult in that such a tank must be placed at relatively high position with respect to the engine, and contain a relatively large amount of coolant so as to buffer the fluctuations in coolant consumption in the coolant jacket. That is to say, as the pump 11 which lifts the coolant from the small reservoir arrangement located below the radiator, is constantly energized (apparently to obviate the need for level sensors and the like arrangement which could control the amount of coolant returned to the coolant jacket) the amount of coolant stored in the separation tank must be sufficient as to allow for sudden variations in the amount of coolant consumed in the coolant jacket due to sudden changes in the amount of fuel combusted in the combustion chambers of the engine. In the event that pump 11 fails however, the system is rendered inoperative as the supply of coolant in the separation tank 6 is soon consumed.

Figure 4:
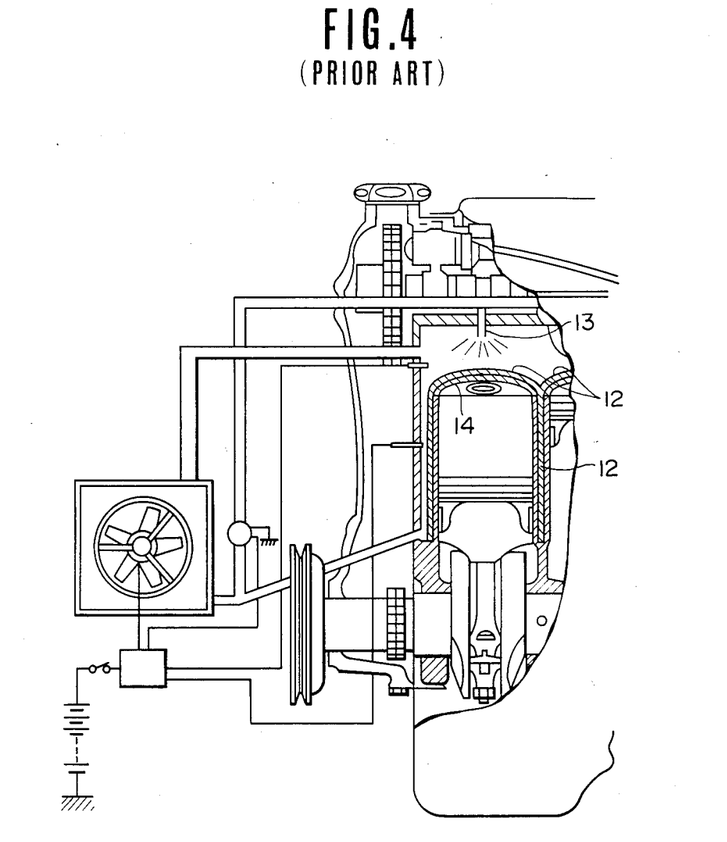

Japanese Patent Application First Provisional Publication No. sho. 56-32026 (see FIG. 4 of the drawings) discloses an arrangement wherein the structure defining the cylinder head and cylinder liners are covered in a porous layer of ceramic material 12 and coolant sprayed into the cylinder block from shower-like arrangements 13 located above the cylinder heads 14. The interior of the coolant jacket defined within the engine proper is essentially filled with only gaseous coolant during engine operation during which liquid coolant is sprayed onto the ceramic layers 12. However, this arrangement has proven totally unsatisfactory in that upon boiling of the liquid coolant absorbed into the ceramic layers, the vapor thus produced and which escapes into the coolant jacket inhibits the penetration of fresh liquid coolant and induces the situation wherein rapid overheat and thermal damage of the ceramic layers 12 and/or engine soon results. Further, this arrangement is plagued with air contamination and blockages in the radiator similar to the compressor equipped arrangement discussed above.

Figure 7:
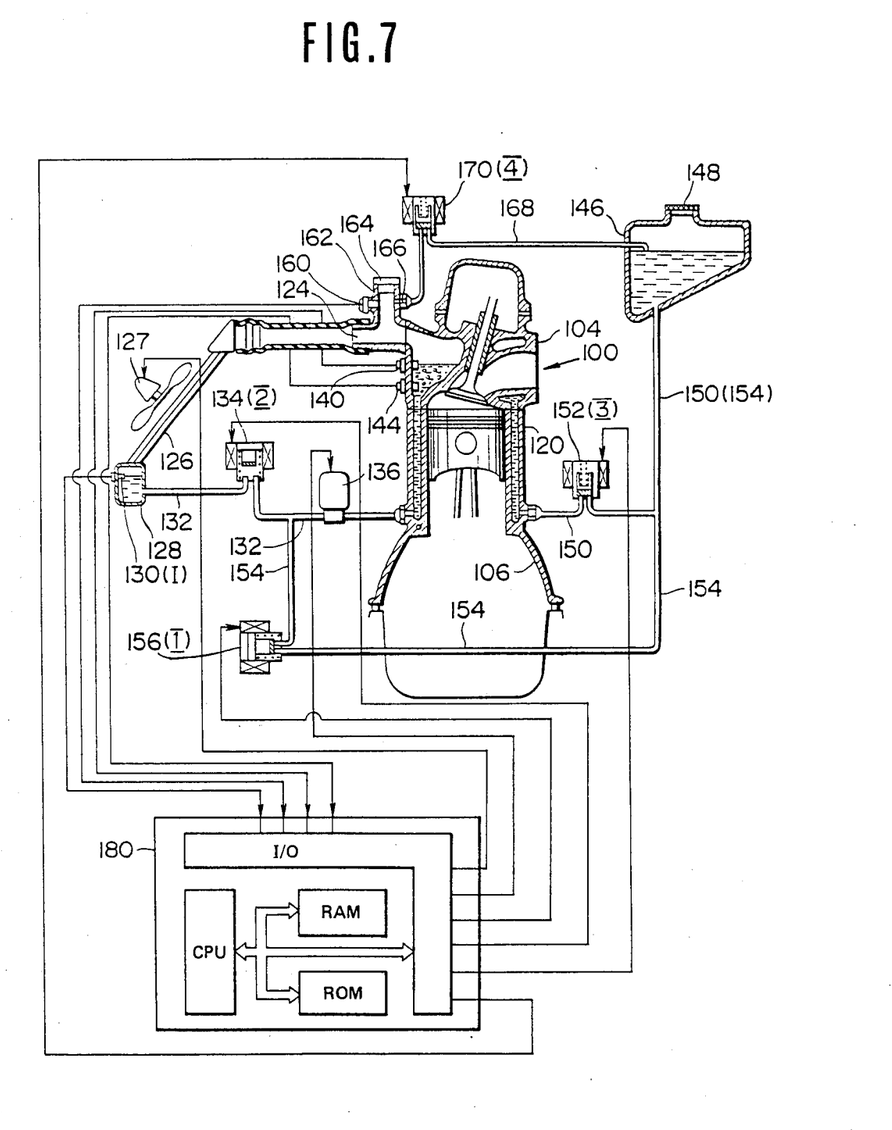
FIG. 7 shows in schematic elevation the arrangement disclosed in the opening paragraphs of the instant disclosure in conjunction with copending U.S. Ser. No. 663,911.

FIG. 7 shows an arrangement which is disclosed in copending U.S. patent application Ser. No. 663,911 filed on Oct. 23, 1984 in the name of Hirano, now U.S. Pat. No. 4,549,505. The disclosure of this application is hereby incorporated by reference thereto.

This arrangement while overcoming the problems inherent in the above discussed prior art has also suffered from the drawbacks that if the coolant return pump 136 becomes inoperative the system as a whole becomes inoperative and if the engine continues to operate under such conditions then the liquid coolant will boil out of the coolant jacket 120 leaving the structure thereof insufficiently immersed in liquid coolant and simultaneously tend to fill the radiator with liquid coolant in a manner which reduces the heat exchange thereof and thus invites rapid engine overheat.

It should be noticed that the same numerals as used in the above mentioned patent application are also used in FIG. 7.

SUMMARY OF THE INVENTON

It is an object of the present invention to provide an evaporative type automotive cooling sytem wherein if the coolant return pump fails or otherwise malfunctions, a back-up system establishes fluid communication between the cooling circuit and the circulation pump of a heater circuit in a manner which enables the heater circulation pump to be used in place of the normal unit until such time as repair can be effected.

More specifically the present invention takes the form of, in an automotive vehicle having a passenger compartment and an engine compartment: an engine, the engine being disposed in the engine compartment and having structure which is subject to high heat flux; a cooling system for removing heat from the engine; and a passenger compartment heating arrangement incorporated with the cooling system, the cooling system and the passenger heating arrangement being characterized by: coolant jacket disposed about the structure and into which coolant is introduced in liquid form and allowed to boil; a radiator fluidly communicated with the coolant jacket, the radiator being arranged to receive gaseous coolant produced by the boiling of the liquid coolant in the coolant jacket and condense same to its liquid form; means for returning liquid coolant from the radiator to the coolant jacket in a manner which maintains the level of coolant in the coolant jacket at a first predetermined level, the first predetermined level being selected to immerse the structure in a predetermined depth of liquid coolant, the liquid coolant returning means including: a coolant return conduit which leads from the bottom of the radiator to the coolant jacket; and a coolant return pump disposed in the coolant return conduit; a cabin heater disposed in the passenger compartment, the cabin heater including a core through which coolant may pass; a first heater conduit leading from the coolant jacket to the core of the heater; a second heater conduit leading from the core of the heater to the coolant jacket; a heater circulation pump disposed in the second heater conduit; a switch-over valve disposed in the second conduit upstream of the circulation pump, the switch-over valve having a first normal state wherein communication between the core of the heater and the coolant jacket is established and a second state wherein the communication between the core and the coolant jacket is interrupted and communication between the radiator and an auxiliary supply conduit which leads from the raditor to the switch-over valve; a control circuit, the control circuit including means for sensing the load on the coolant return pump when energized and for switching the switch-over valve from the first normal position to the second position when the load on the coolant return pump is sensed as being outside of a predetermined range, and for operating the circulation pump in lieu of the coolant return pump.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Before proceeding with the description of the embodiments of the present invention, it is deemed appropriate to discuss some of the basic features of the cooling system to which the present invention is applied.

Figure 5:
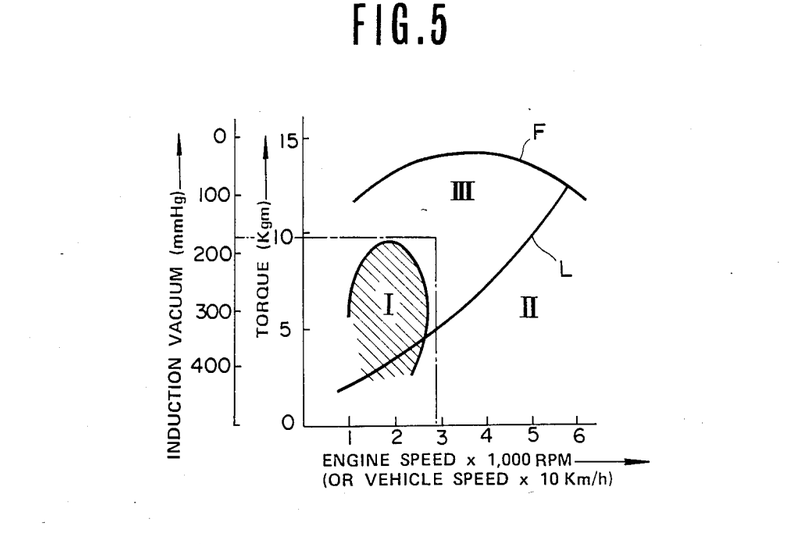
FIG. 5 is a graph showing in terms of induction vacuum (load) and engine speed the various load zones encountered by an automotive internal combustion engine.
Figure 6:
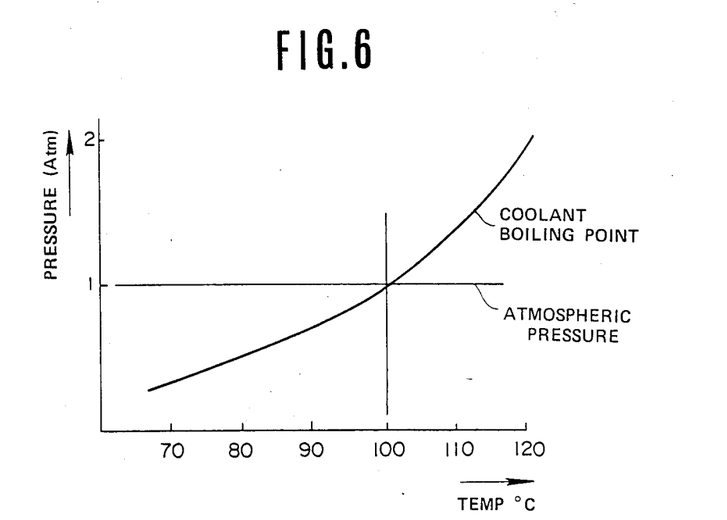
FIG. 6 is a graph showing in terms of pressure and temperature, the change which occurs in the coolant boiling point with change in pressure.

FIG. 5 graphically shows in terms of engine torque and engine speed the various load "zones" which are encountered by an automotive vehicle engine. In this graph, the curve F denotes full throttle torque characteristics, trace L denotes the resistance encountered when a vehicle is running on a level surface, and zones I, II and III denote respectively "urban cruising", "high speed cruising" and "high load operation" (such as hillclimbing, towing etc.).

A suitable coolant temperature for zone I is approximately 110° C. while 90°-80° C. for zones II and III. The high temperature during "urban cruising" promotes improved thermal efficiency. On the other hand, the lower temperatures ensure that sufficient heat is removed from the engine and associated structure to prevent engine knocking and/or engine damage in the other zones. For operational modes which fall between the aforementioned first, second and third zones, it is possible to maintain the engine coolant temperature at approximately 100° C.

With the present invention, in order to control the temperature of the engine, advantage is taken of the fact that with a cooling system wherein the coolant is boiled and the vapor used a heat transfer medium, the amount of coolant actually circulated between the coolant jacket and the radiator is very small, the amount of heat removed from the engine per unit volume of coolant is very high, and upon boiling, the pressure prevailing within the coolant jacket and consequently the boiling point of the coolant rises if the system employed is closed. Thus, by circulating only a limited amount of cooling air over the radiator, it is possible reduce the rate of condensation therein and cause the pressure within the cooling system to rise above atmospheric and thus induce the situation, as shown in FIG. 7, wherein the engine coolant boils at temperatures above 100° C. for example at approximately 119° C. (corresponding to a pressure of approximately 1.9 Atmospheres).

On the other hand, during high speed cruising, it is further possible by increasing the flow cooling air passing over the radiator, to increase the rate of condensation within the radiator to a level which reduces the pressure prevailing in the cooling system below atmospheric and thus induce the situation wherein the coolant boils at temperatures in the order of 80° to 90° C. However, under such conditions the tendency for air to find its way into the interior of the cooling circuit becomes excessively high and it is desirable under these circumstances to limit the degree to which a negative pressure is permitted to develop. This can be achieved by permitting coolant to be introduced into the cooling circuit from the reservoir and thus raise the pressure in the system to a suitable level.

Figure 8:
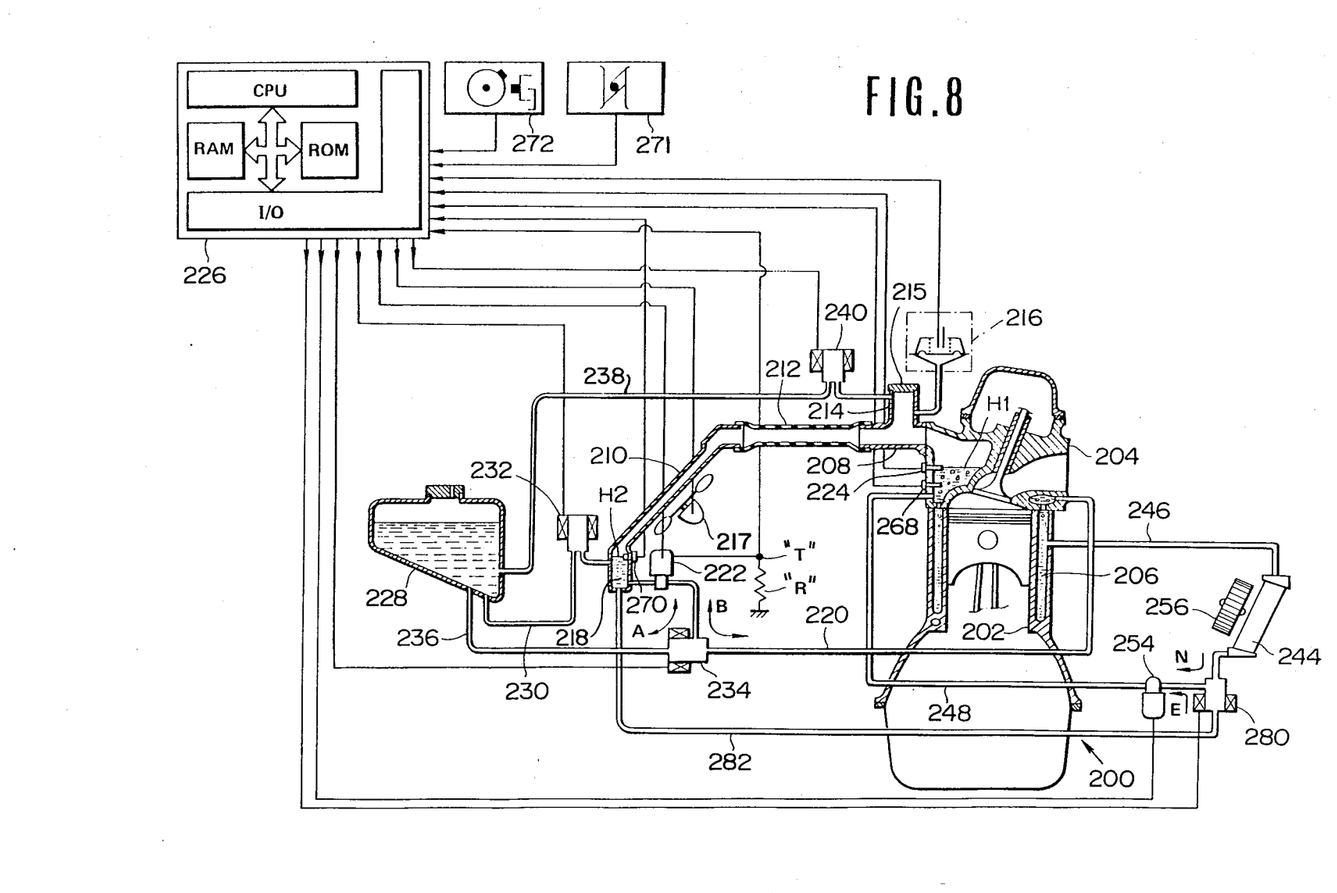
FIG. 8 shows an engine system equipped with a first embodiment of the present invention.

FIG. 8 shows an engine system incorporating a first embodiment of the present invention. In this arrangement an engine 200 is includes a cylinder block 202 on which a cylinder head 204 is detachably secured. The cylinder block and cylinder head are formed with suitable cavities in a manner to define a coolant jacket 206 about structure of the engine such as the combustion chambers exhaust ports and valves which are subject to a high heat flux. A vapor manifold 208 secured to the cylinder head 204 communicates with a condenser or radiator 210 as it will be referred to hereinafter, via a vapor transfer conduit 212. The vapor manifold 208 is formed with a riser 214 which is hermetically sealed by a cap 215. Communicating with the vapor manifold 208 at a location adjacent the riser 214 is a pressure responsive switch arrangement 216. In this embodiment the switch is arranged to be triggered in response to a predetermined (negative) pressure differential developing between the interior of the coolant jacket 206 and the ambient atmosphere.

Located adjacent the radiator 210 is an electrically driven fan 217 which is arranged to selectively increase the flow of ambient air over the surface of the tubing and the like which constitutes the heat exchanging surface area of the radiator 210. Disposed at the bottom of the radiator 210 is a small collection vessel or lower tank 218 as it will be referred to hereinafter.

A coolant return conduit 220 leads from the lower tank 218 to the coolant jacket 206 of the engine 200. A small capacity reversible coolant return pump 222 is disposed in this conduit and arranged to be selectively energizable in a manner which when operated in a first or "forward" direction inducts coolant from the lower tank 218 and forces same toward and into the coolant jacket 206. In this embodiment the return conduit communicates with a section of the coolant jacket 206 formed in the cylinder head 204. This arrangement is advantageous from the point of introducing relatively cool coolant into a zone wherein boiling tends to be most vigorous. This manner of coolant introduction tends to damp the frothing and bumping which tends to frequently occur in this zone (viz., a zone close to the highly heated cylinder heads, exhaust ports and valves of the engine.

In order to maintain the level of coolant at a first predetermined level H1, a first level sensor 224 is disposed in the coolant jacket 206 as shown. As will be appreciated the level H1 is selected to be a predetermined height above the upper level the structure of the engine subject to the highest heat flux (viz., the combustion chambers, exhaust ports and valves). The output of sensor 224 is fed to a control circuit 226 which in this embodiment includes a microprocessor comprised of a CPU, RAM, ROM and an in-out interface I/O. The control circuit 226 in turn issues an energizing signal to the coolant return pump 222 each time that level sensor 224 indicates that the level of coolant in the coolant jacket 206 has decreased below level H1 and it is necessary to replenish same in order to maintain the highly heated structure of the engine immersed in sufficient liquid coolant and thus avoid localized dry-outs and hot spot formation which tend to occur upon the occurrance of vigorous bumping and frothing of the boiling coolant. It is within the scope of the present invention to arrange for the level sensor to exhibit hysteresis characteristics so as to obviate rapid ON/OFF cycling of pump 222.

Located adjacent the engine 200 is a coolant reservoir 228. This reservoir is arranged to communicate with the cooling circuit of the engine—vis., the coolant jacket 206, vapor manifold 208, vapor transfer conduit 212, radiator 210, coolant return conduit 220 and pump 222—via a valve and conduit arrangement which includes: a coolant fill/discharge conduit 230 which leads from the reservoir 228 to the lower tank 218; an ON/-OFF type electromagnetic valve 232 which is disposed in this conduit and arranged to permit fluid communication between the reservoir 228 and lower tank 218 when de-energized; a three-way valve 234 which is disposed in the coolant return conduit 220 at a location between the coolant return pump 222 and the coolant jacket 206 and is arranged to selectively provide fluid communication between the reservoir 228 via a coolant induction conduit 236 (viz., flow path A) when in a first state (in this case de-energized) and establish "normal" communication between the pump and the coolant jacket 206 (flow path B) when in a second state (energized); and overflow conduit 238 which leads from a "purge" port formed in the riser 214 immediately below the cap 215; and a normally closed ON/OFF type valve 240 disposed in overflow conduit 238 and which permits fluid communication between the cooling circuit and the reservoir 228 when energized to assume an open state.

Disposed in a cabin of the vehicle (not shown) is a heater arrangement including a core 244 through which heated coolant may be circulated. As shown, core 244 communicates with the coolant jacket 206 via conduits 246, 248. The first conduit 246 is arranged to communicate with the cylinder block 204 while the second conduit 248 is arranged to communicate with the cylinder head 204 at a level below H1.

A coolant circulation pump 254 is disposed in the second conduit 248.

The cabin heating arrangement further includes a fan 256 for forcing a draft of air through the finning of the heater core. As heating and/or air-conditioning arrangements are well known in the art no further discussion of same will be given for brevity.

A temperature sensor 268 is disposed in the coolant jacket 206. In this embodiment sensor 268 is arranged in the cylinder head 204 in a manner to be immersed in the liquid coolant and in close proximity to the most highly heated structure of the engine. The output of the temperature sensor 268 is fed to the control circuit 226.

In order to facilitate the control of the cooling system during the various modes of operation thereof, a second level sensor 270 is disposed in the lower tank 218 and arranged to sense the level of coolant having reached a second level H2 which is selected to lower than the tubing of the radiator 210 via which the latent heat of evaporation of the coolant is released to the surrounding ambient atmosphere; and essentially at the same level as fill/discharge conduit 230. This particular arrangement is deemed advantageous in the event that a "hot non-condensible purge" should be necessary to flush out any stubborn pockets of air which may be trapped in the radiator 210 and reducing the heat exchange efficiency thereof to the point of inducing system overheat. Viz., should the temperature rise to a level which cannot be controlled via energizations of fan 217 it is possible to momentarily open vave 232 and permit the pressurized vapor in the radiator 210 to vent out through conduit 230 to the reservoir 228. As will be appreciated, in order to minimize the amount of coolant which is displaced during this mode of operation and to maximize the tendency for any air or the like non-condensible matter in the radiator to be flushed out with the vented vapor, it is advantageous to arrange of the lower end of conduit at level H2 whereat the level of liquid coolant in the lower tank 218 is apt to be maintained under such conditions.

In order to sense the load and/or other engine operational parameters a load sensor 271 and an engine speed sensor 272 are arranged to submit data signals to control circuit 226. The load sensor 271 may take the form of a throttle valve position switch, air flow meter an induction vacuum switch or the like. Alternatively, the pulse width of a fuel injection control signal may be used. The engine ignition system may be tapped to provide the engine speed signal in the event that a crank angle sensor is not available.

In order to provide a back-up arrangement which will enable coolant to be circulated from the radiator 210 to the coolant jacket 206 in the event of pump 222 mafunctioning, a back-up circuit is arranged to interconnect the engine cooling circuit with the cabin heating circuit. This back-up circuit includes (a) a three-way switch over valve 280 disposed in conduit 248 of the cabin heating circuit at a location upstream of the coolant circulation pump 254 and (b) an auxiliary supply conduit 282 which communicates with the lower tank 218. Under normal circumstances the valve is condition to assume a "normal" position wherein communication between the heater core 244 and the coolant circulation pump 254 is established (via., flow path "N"). However, in the event of the coolant return pump 222 malfunctioning to the point of becoming inoperative or being incapable of returning sufficient coolant to the coolant jacket 206, then the control circuit conditions valve 280 to swtich to a second position wherein communication between the coolant circulation pump 254 and the lower tank 218 is established (viz., emergency flow path "E").

A convenient technique of detecting pump malfunction is to measure the current it draws during operation. In this manner, if the pump motor and the pump element have become disconnected for example, even though the pump motor is running as normal the load thereon is greatly reduced and the amount of current drawn by the motor notably reduced. On the other hand, if the pump element or motor bearing for example have jammed or otherwise failed in a manner that pump operation is either rendered impossible or difficult, the load on the pump motor increases sharply. Under such circumstances the abnormally large amount of electrical current which the pump tends to draw can used as a parameter to indicate the abnormal state. Accordingly, by sampling the volatage at a terminal "T" between the motor and a grounded resistance "R" of known value, the amount of current being drawn by the motor of the pump 222 can be readily determined.

If the sampling of the pump motor power requirement indicates an abnormal condition the control circuit responds by condition the switch over valve 280 provide flow path "E" and energize pump 254 in response to the ouput of level sensor 224. Of course it is also necessary to issue a warning that it has been necessary to employ the back-up system and the main coolant return pump is out of order. This warning may be made by sounding a buzzer or illuminating a warning lamp on the instrument panel of the vehicle to which the invention is applied. As will be appreciated the cabin heating circuit will be temporarily disabled upon the implementation of the back-up system.

Prior to initial use it is necessary to completely fill the cooling circuit and the conduiting 246, 248 and heater core 244 which form vital part of the heating system with liquid coolant in a manner to completely displace any non-condensible matter. This operation may be accomplished by removing cap 215 and manually filling the system. At this time it is deemed advantageous to energize coolant circulation pump 254 in a manner which flushes out any air that might be in the core 244 and conduits 246, 248. To facilitate this operation it is possible to add a manually operable switch (not shown) which selectively energizes the pump. It is further possible to introduce coolant into the reservoir 228 and manually induce the energization of the valves 232, 234 and pump 222 (in a "reverse" direction) and thus pump excess coolant into the system until a visible overflow occurs at the riser 214. This type of arrangement also facilitates regular servicing of the system.

Figure 9:
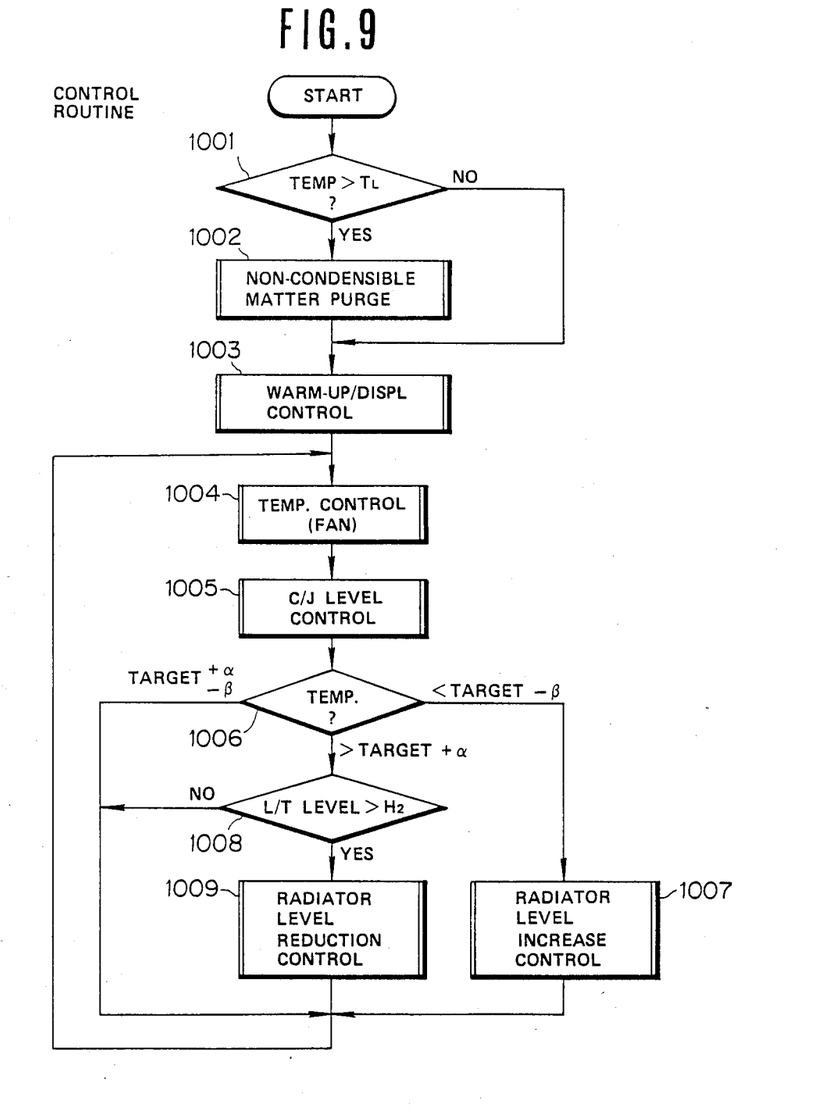
FIGS. 9 to 11 are flow charts which show the steps which characterize the operation of the present invention.

FIG. 9 shows in flow chart form a control routine which manages the overall operation of the cooling system shown in FIG. 8. As shown, subsequent to start of the engine and initialization of the system, the coolant temperature is determined by sampling the output of temperature sensor 222 at step 1001. In the event that the coolant temperature is below a predetermined level ($T_L$) which in this case is selected to be 45° C., the control program flows to step 1002 wherein a non-condensible matter purge sub-routine is run. However, if the temperature is above 45° C. then the program bypasses the purge operation and proceeds directly to step 1003 on the assumption that as the coolant is still warm, the engine has not cooled sufficiently and there has been insufficient time for atmospheric air or the like to have leaked into and contaminated the cooling circuit of the engine.

The non-condensible matter purge routine is such as to condition valve 240 to assume an open condition, valve 232 to close and vavle 234 to establish flow path A. With the system thus conditioned pump 222 is operated in the reverse mode for a predetermined period of time (e.g. 10 seconds) to induce coolant from reservoir 228 and pump same into the lower tank 218. As valve 240 is open at this time any excess coolant forced into the cooling circuit overflows along with any non-condensible matter back to the reservoir via overflow conduit 238.

At step 1003 a warm-up/displacement mode of operation is entered. During this routine any excess coolant which has entered the cooling circuit while the engine was stopped will be displaced until (a) the coolant boils at a temperature which is deemed appropriate for the instant mode of engine operation or (b) a minimum amount of coolant (viz., the coolant in the coolant jacket 206 and lower tank 214 both assume level H1 and H2 respectively) is retained in the cooling circuit.

During this mode as the coolant is not circulated through the radiator 210 very little heat is lost from the system and the coolant quickly heats to the point of producing coolant vapor. As the pressure rises within the cooling circuit the coolant contained therein is displaced back out to the reservoir 228 via conduit 230 (valve 232 being conditioned to assume an open condition at this time). However, it is possible for coolant to be displaced in a manner wherein the level of coolant in the radiator 210 reaches level H2 before the level of coolant in the coolant jacket 206 drops to level H1; or in a manner wherein the level H2 is reached before the level of coolant in the radiator lowers to level H2. Accordingly, it is necessary to monitor the outputs of both level sensors 224 and 270 so as to avoid the situation wherein an overdisplacement of coolant occurs leaving the system with less then than a minimum of coolant therein (the minimum quantity of coolant being defined when the level of coolant in the coolant jacket and the radiator are at levels H1 and H2 respectively).

It should be noted that when the engine is stopped and has assumed a predetermined condition (i.e. the sytem is cooled by continued fan operation until atmospheric pressure or a slighly sub-atmospheric pressure prevails in the cooling cirtcuit) under the control of a 'shut-down' control routine (flow chart not shown), that liquid coolant from the reservoir 228 is permitted to be introduced into the coolant circuit under the influence of the pressure differential which develops as the coolant vapor condenses to its liquid state. Accordingly, depending on the temperature of the coolant and the amount of coolant vapor which is present in the cooling circuit, the latter will tend to be partially to completely filled with liquid coolant.

Following the coolant displacement the control program flows to step 1004 wherein the operation of the fan 217 is controlled in a manner to maintain the temperature of the coolant in the coolant jacket 206 at a level which is deemed to be most appropriate for the instant set of engine operational conditions.

At step 1005 a pump control routine is implemented in order to maintain the level of coolant in the coolant jacket at H1. Following this the temperature of the coolant is determined in step 1006 and ranged in a manner that if within a range of target $+\alpha$ to target $-\beta$ then the program flows to back to step 1004. However, if the temperature is lower than target $-\beta$ then at step 1007 a routine which increases the level of coolant in radiator 210 is implemented while if the temperature is greater than target $+\alpha$ then at step 1008 the level of coolant in the lower tank 218 is determined by sampling the output of level sensor 270. In the event that the level of coolant in the lower tank 218 is above H2 then the program proceeds to step 1009 wherein a radiator level reduction control routine is run. However, if the outcome of the enquiry carried out at step 1008 indicates that the level of coolant is not above H2 then the program recycles to step 1004.

Figure 10:
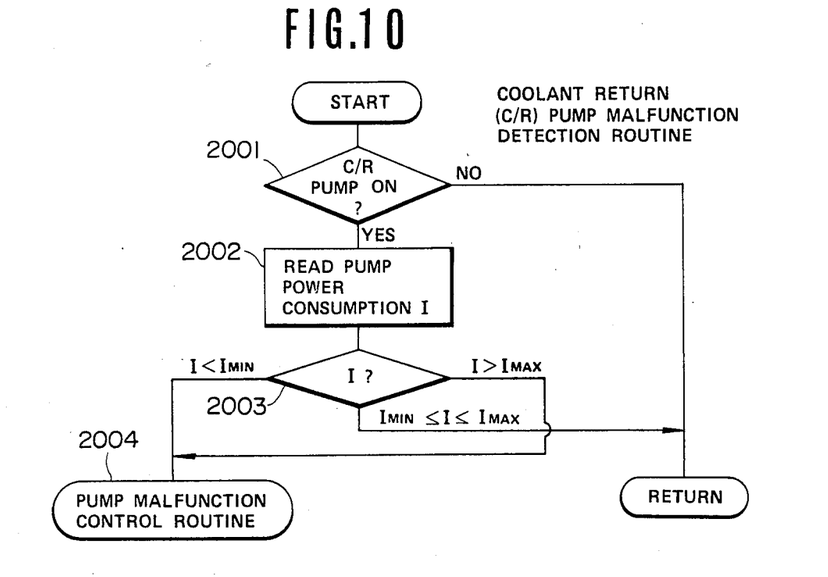

FIG. 10 shows in flow chart form the routine which is executed at predetermined time intervals for the purposes of checking if the pump is on and if on, whether the amount of current being drawn by the pump is within predetermined limits which define malfunction free operation. As shown, as step 2001 it is determined if the coolant return pump 222 is on or not. In the event that the pump is not in use then the program returns. On the other hand if the pump is found to be ON the program goes to step 2002 wherein the power consumption of the pump motor is read. This in the instant embodiment is done by sampling the voltage at terminal T and deriving the current using the equation $$V = I \cdot R$$

wherein:
I is the amount of current flowing through terminal "T";
V is the voltage appearing at terminal "T"; and
R is resitance of the resistor "R";

As will be appreciated it is a simple matter to sense the amount of current being drawn by the pump motor. Subsequently, at step 2003 the value derived in step 2002 is compared with upper and lower current limits Imax and Imin. In the event that the amount of current being used by the pump motor is within the range defined by the upper and lower limits the program returns. However, if the power comsumption is outside of this range then at step 2004 a pump malfunction control routine is executed.

Figure 11:
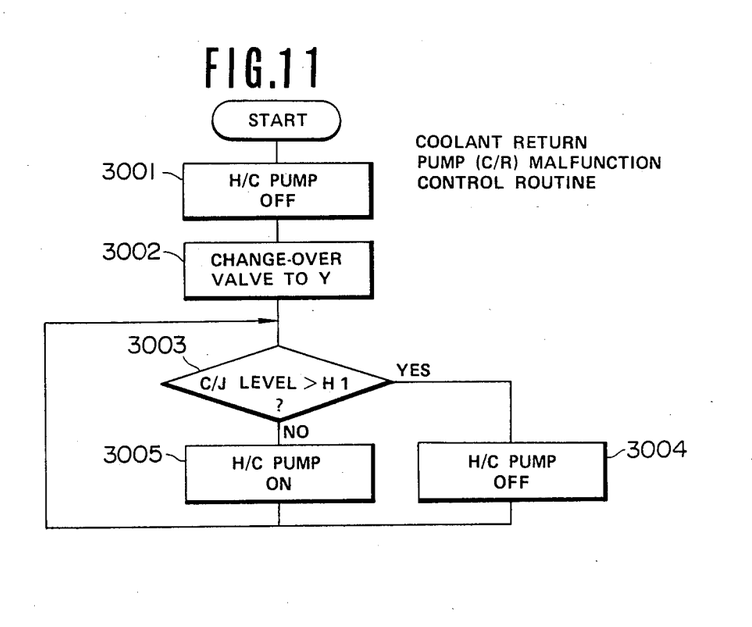

As shown in FIG. 11 the first step of the malfunction control rountine is such as to issue a commant to stop the operation of the heater circulation pump 254. At step 3002 a command to switch change-over valve 280 from its normal position to that in which flow path N is established is issued. Subsequently at step 3003 the output of level sensor 224 is sampled. In the event that the level of coolant in the coolant jacket 206 is indicated as being above H1 then a command to stop the operation of the heater circulation pump is issued. On the other hand, if the level is not above H1 then the pump is energized to induct coolant from the lower tank via conduit 282 and switch over valve 280 and introduce same into a section of the coolant jacket formed in the cylinder head via conduit 248. Subsequent runs of the program depicted by the flow charts in FIGS. 10 and 11 ensure that even though the main coolant return device is inoperative still the engine can be operated without thermal damage or the like until suitable repair can be effected.

For further disclosure relating to the control of the arrangement shown in FIG. 8 reference can be had to copending U.S. patent application Ser. No. 751,536 filed on July 3, 1985 in the name of Hirano et al. The content of this application is hereby incorporated by reference thereto.

What is claimed is:

1. In an automotive vehicle having a passenger compartment and an engine compartment:
    an engine, said engine being disposed in said engine compartment and having structure which is subject to high heat flux;
    a cooling system for removing heat from said engine; and
    a passenger compartment heating arrangement incorporated with said cooling system, said cooling system and said passenger heating arrangement comprising:
    a coolant jacket disposed about said structure and into which coolant is introduced in liquid form and allowed to boil;
    a radiator fluidly communicated with said coolant jacket, said radiator being arranged to receive gaseous coolant produced by the boiling of the liquid coolant in said coolant jacket and condense same to its liquid form;
    means for returning liquid coolant from said radiator to said coolant jacket in a manner which maintains the level of coolant in said coolant jacket at a first predetermined level, said first predetermined level being selected to immerse said structure in a predetermined depth of liquid coolant, said liquid coolant returning means including:
    a coolant return conduit which leads from the bottom of said radiator to said coolant jacket; and
    a coolant return pump disposed in said coolant return conduit;
    a cabin heater disposed in said passenger compartment, said cabin heater including a core through which coolant may pass;
    a first heater conduit leading from said coolant jacket to the core of said heater;
    a second heater conduit leading from the core of said heater to said coolant jacket;
    a heater circulation pump disposed in said second heater conduit for circulating coolant from said coolant jacket through the core of said heater;
    a switch-over valve disposed in said second conduit upstream of said circulation pump, said switch-over valve having a first normal state wherein communication between the core of said heater and said coolant jacket is established and a second state wherein the communication between the core and the coolant jacket is interrupted and communication is established between said radiator and an auxiliary supply conduit which leads from said radiator to said switch-over valve;
    a control circuit, said control circuit including means for sensing the load on said coolant return pump when energized and for switching said switch-over valve from said first normal position to said second position when the load on said coolant return pump is sensed as being outside of a predetermined range, and for operating said circulation pump in lieu of said coolant return pump.

2. A vehicle as claimed in claim 1, further comprising a first parameter sensor which senses a parameter which varies with the temperature of the coolant in said coolant jacket.

3. A vehicle as claimed in claim 2, wherein: said coolant jacket, said radiator, and said coolant return means define a cooling circuit and wherein said said first and second conduits and said radiator core define a heater circuit; and which further comprises:
    a reservoir the interior of which is maintained constantly at atmospheric pressure;
    valve and conduit means for selectively providing fluid communication between said cooling circuit and said reservoir; and
    a control circuit for controlling the operation of said valve and conduit means.

4. A vehicle as claimed in claim 2, further comprising a device disposed with said radiator for varying the rate of heat exchange between a cooling medium surrounding the radiator and said radiator.

5. A vehicle as claimed in claim 3, wherein said valve and conduit means includes a second level sensor, said second level sensor being disposed in a small collection vessel disposed at the bottom of said radiator.

6. A vehicle as claimed in claim 5, wherein said valve and conduit means further comprises:
    an overflow conduit leading from an upper section of said coolant jacket to said radiator;
    a first valve disposed in said overflow conduit; said first valve having a first position wherein communication between said coolant jacket and said reservoir is cut-off and a second position wherein communication between said coolant jacket and said reservoir is permitted;
    a second valve disposed in said coolant return conduit between said coolant return pump and said coolant jacket;
    an induction conduit leading from said reservoir to said second valve, said second valve having a first position wherein communication between said pump and said coolant jacket is established and a second position wherein communication between said pump and said coolant jacket is interrupted and communication between said reservoir and said pump established;
    a fill/discharge conduit leading from said reservoir to said cooling circuit; and
    a third valve disposed in said fill/discharge conduit, said third valve having a first position wherein communication between said reservoir and said radiator is permitted and a second position wherein communication between said radiator and said cooling circuit is interrupted.

7. A vehicle as claimed in claim 6, further including a second parameter sensor for sensing a parameter which varies with load on said engine.

8. A vehicle as claimed in claim 7, wherein said control circuit further includes means for:

determining a target temperature at which the coolant in said coolant jacket should be maintained for the given engine load;

operating said device in manner to increase the amount of heat exchanged between the cooling medium surrounding the radiator and the said radiator.

9. A vehicle as claimed in claim 8, wherein said control circuit further includes means for:

sensing the temperature of the coolant being below a second predetermined level;

conditioning said valve and conduit means and said coolant return pump in a manner to induct coolant from said reservoir via said induction conduit and pump same into said cooling circuit and permit the excess coolant to overflow back to said reservoir via said overflow conduit and further conditioning said coolant circulation pump to circulate coolant through said core in said first flow direction in a manner which flushes non-condensible matter out of said cooling circuit.

10. A vehicle as claimed in claim 9, wherein said control circuit further includes means for:

conditioning said valve and conduit means to introduce coolant from said reservoir to said cooling circuit in the event that the temperature of the coolant in said coolant jacket falling below a third predetermined temperature.

11. A vehicle as claimed in claim 10, wherein said control circuit further comprises means for:

conditioning said valve and conduit means and said coolant return pump in response to the temperature being above a fourth predetermined temperature to discharge coolant from said radiator via said fill-/discharge conduit in a manner to reduce the pressure and temperature of the coolant in said cooling circuit.

12. A vehicle as claimed in claim 1, wherein said coolant return means further includes:

a first level sensor disposed in said coolant jacket at a first predetermined level, said first predetermined level being selected to be above the engine structure which is subject to high heat flux.

13. A vehicle as claimed in claim 1, wherein said load sensing means includes:

a resistance of known ohmic value connected between the motor of said coolant return pump and ground, and means for sensing the voltage which develops at a terminal located between the motor of said pump and said resistance.

* * * * *